United States Patent
Sanchez et al.

(10) Patent No.: US 10,730,035 B2
(45) Date of Patent: Aug. 4, 2020

(54) NANOSTRUCTURED AMORPHOUS BORON MATERIAL

(71) Applicants: CENTRE NATIONAL DE LA RECHERCHE SCIENTIFIQUE, Paris (FR); COLLEGE DE FRANCE, Paris (FR); UNIVERSITE PIERRE ET MARIE CURIE (PARIS 6), Paris (FR)

(72) Inventors: Clément Sanchez, Bures sur Yvette (FR); Christel Gervais Stary, Paris (FR); David Portehault, Le Kremlin-Bicetre (FR); Guillaume Gouget, Paris (FR)

(73) Assignees: CENTRE NATIONAL DE LA RECHERCHE SCIENTIFIQUE, Paris (FR); COLLEGE DE FRANCE, Paris (FR)

( * ) Notice: Subject to any disclaimer, the term of this patent is extended or adjusted under 35 U.S.C. 154(b) by 1 day.

(21) Appl. No.: 15/738,375

(22) PCT Filed: Jun. 23, 2016

(86) PCT No.: PCT/FR2016/051545
§ 371 (c)(1),
(2) Date: Dec. 20, 2017

(87) PCT Pub. No.: WO2016/207558
PCT Pub. Date: Dec. 29, 2016

(65) Prior Publication Data
US 2018/0169620 A1    Jun. 21, 2018

(30) Foreign Application Priority Data

Jun. 25, 2015 (FR) .................. 15 55878

(51) Int. Cl.
*B01J 21/02* (2006.01)
*B01J 23/04* (2006.01)
(Continued)

(52) U.S. Cl.
CPC ............. *B01J 21/02* (2013.01); *B01J 23/04* (2013.01); *B01J 27/10* (2013.01); *B01J 35/1023* (2013.01);
(Continued)

(58) Field of Classification Search
CPC ........ B01J 21/02; B01J 35/1023; B01J 21/04; C01B 35/023; C01P 2004/50
See application file for complete search history.

(56) References Cited

U.S. PATENT DOCUMENTS 6,511,943 B1 *  1/2003  Serquis .................. C01B 35/04
                                                        252/521.4

FOREIGN PATENT DOCUMENTS

EP    2199258    6/2010

OTHER PUBLICATIONS

Dou et al (Preparation of amorphous nano-boron powder with high activity by combustion synthesis, J. Cent. South. Univ. (2014), 21:900-903).*

(Continued)

*Primary Examiner* — Jun Li
(74) *Attorney, Agent, or Firm* — Ipsilon USA, LLP (57) ABSTRACT

A nanostructured material consisting essentially of boron. The material is in amorphous form and comprising aggregates of boron nanoparticles. A method of preparation thereof and the uses thereof.

18 Claims, 8 Drawing Sheets

(51) Int. Cl.
B01J 27/10 (2006.01)
B01J 35/10 (2006.01)
C01B 35/02 (2006.01)

(52) U.S. Cl.
CPC ........ *C01B 35/023* (2013.01); *C01P 2002/72* (2013.01); *C01P 2002/86* (2013.01); *C01P 2004/04* (2013.01); *C01P 2004/50* (2013.01); *C01P 2006/10* (2013.01); *C01P 2006/12* (2013.01)

(56) References Cited

OTHER PUBLICATIONS

Wang et al., "Synthesis of nano-sized amorphous boron powders through active dilution self-propagating high temperature synthesis method", Materials Research Bulletin vol. 48 , 2013, p. 2018-2022.*
Shoji et al., Boron-Boron σ-Bond Formation by Two-Electron Reduction of a H-Bridged Dimer of Monoborane, Journal of the American Chemical Society, 2011, vol. (133), p. 11058-11061).*
Amorphous boron nanoparticles and BN encapsulating boron nano-peanuts prepared by . . . dated Dec. 31, 2003.
International search report dated Apr. 20, 2016.

* cited by examiner

NANOSTRUCTURED AMORPHOUS BORON MATERIAL

RELATED APPLICATION

This application is a National Phase of PCT/FR2016/051545, filed on Jun. 23, 2016, which in turn claims the benefit of priority from French Patent application No. 15 55878, file on Jun. 25, 2015 the entirety of which are incorporated by reference.

FIELD OF THE INVENTION

The invention relates to a nanostructured material consisting essentially of boron, said material being in amorphous form and comprising aggregates of boron nanoparticles, as well as the method of preparation thereof and the uses thereof.

DESCRIPTION OF THE RELATED ART

Elemental boron (i.e. of oxidation number zero) is widely described in the literature in the amorphous state or in the crystalline state. Elemental boron does not exist in the natural state. Most often boron is found combined with oxygen and metals (e.g. Na, Ca), for example in borax $Na_2B_4O_7.10H_2O$ (or sodium tetraborate decahydrate), borosilicate glasses (Pyrex®), boric acid ($H_3BO_3$), colemanite ($Ca_2B_6O_{11}.5H_2O$), kernite ($Na_2B_4O_7.4H_2O$), ulexite ($NaCaB_5O_9.8H_2O$) and various borates.

Many industrial sectors (e.g. the pharmaceutical, glass, iron and steel, military, semiconductor, textile or nuclear industries) find it advantageous to use boron and boron compounds. The energy sector also benefits from the advantages of this element. In fact, several studies have demonstrated the energy potential of boron relative to conventional motor fuels and hydrogen, and indicate that boron could be a material or a component of materials for storage of dihydrogen for a zero-emissions vehicle.

In particular, boron plays an important role in nuclear reactors owing to its capacity for absorbing neutrons, and boron steel is used as rods in nuclear power stations. Boron compounds are used in various applications, including the manufacture of certain grades of glass and of detergents. Boron reacts directly with most metals to produce metal borides such as magnesium diboride ($MgB_2$). It can also be used as a reactant to give boron carbides or boron nitrides. Boron and boron alloys possess good properties of hardness, electrical and heat conduction, photoconduction or also superconductivity. Boron can in particular be used in coatings that are resistant to mechanical stresses and to radiation or in materials for storage of dihydrogen.

The amorphous (i.e. non-crystalline) phase of elemental boron is characterized by the absence of grain boundaries in its structure, giving it high breaking strength and good imperviousness. Moreover, it is more reactive than the crystalline phase. However, on the one hand, amorphous elemental boron is an element that is very difficult to obtain in the pure state since it oxidizes very easily; and on the other hand, it is rather unreactive, or even inert, compared to other heteroelements such as phosphorus. Accordingly, its subsequent processing or application requires very high temperatures and/or pressures.

The best known methods for obtaining amorphous boron are based on:
- reduction of boron oxide or boric acid by a very reducing metal such as magnesium, aluminium, an alkali metal or alkaline-earth metal;
- electrolysis of borates and/or boron oxides in a molten bath consisting of various magnesium salts (e.g. $MgCl_2$, $MgSO_4$, $MgCO_3$);
- reduction of boron compounds such as boron halides in the presence of dihydrogen; and
- decomposition of gaseous molecular precursors such as boranes or boron halides on surfaces or by electric arc.

These methods generally lead to massive amorphous boron, i.e. in the form of micrometric or submicrometric particles (i.e. particles with diameter greater than about 100 nm), of low reactivity, notably owing to their low specific surface area (e.g. below about 50 $m^2 \cdot g^{-1}$) and generally partly oxidized on the surface, notably in contact with air. Furthermore, they involve high costs and/or high temperatures and/or considerable environmental risks.

The current method for commercial production of amorphous boron in large amounts is reduction of boron oxide with magnesium according to the following main reaction:

$$3Mg+B_2O_3 \rightarrow 2B+3MgO$$

The reaction is performed in a vertical reactor protected from oxygen by an argon stream. The crude product obtained is crushed into small pieces of about 1 mm and is washed in hydrochloric acid to remove the numerous reaction by-products. Massive amorphous boron of purity ranging from about 86 to 95% is thus obtained by this method.

The commercial amorphous borons currently available are characterized by a specific surface area of the order of 10-20 $m^2 \cdot g^{-1}$, reflecting a boron that is in the form of micrometric particles (i.e. particle diameter ranging from about 0.6 to 4 µm) and accordingly is of low reactivity.

In order to improve the reactivity of the boron obtained, other methods have focused on the preparation of boron in the form of nanoparticles with diameter below about 100 nm.

In particular, Bellot et al. [*Chem. Commun.*, 2009, 3214-3215] describe the preparation of elemental boron by pyrolysis of decaborane under argon at a pressure of 1 atmosphere and a temperature in the range from about 700 to 900° C. The elemental boron powder obtained comprises about 97 mol % of boron, is free from boron oxide and comprises boron nanoparticles having a diameter in the range from about 45 to 100 nm according to images obtained by transmission electron microscopy. However, the boron is predominantly in crystalline form, and consequently in a phase with low reactivity or unreactive. Moreover, decaborane is an expensive source of boron (about 5000 € for 100 g), and production yields are low (40%).

Grinding of massive amorphous boron or mechanosynthesis by grinding oxidized precursors such as boron oxide, boric acid or borates in the presence of a reducing agent (e.g. alkali metal or alkaline-earth metal or borohydride) also makes it possible to reduce the size of the boron particles obtained. In particular, McCrary et al. [*Chem. Commun.*, 2012, 1-4] describe the preparation of boron nanoparticles with a diameter of about 60 nm. The McCrary method comprises a step of grinding commercial massive amorphous boron (particle size of the order of 2 µm) for 12 hours, then a step of grinding the mixture obtained in the presence of an ionic liquid [MAT][DCA] (i.e. 1-methyl-4-amino-1,2,4-triazolium dicyanamide) for 6 hours and finally a step of grinding the mixture from the preceding step in acetonitrile for 6 hours. However, the reactivity of the amorphous boron has not been optimized, as the boron nanoparticles obtained are still too large.

Objects and Summary

The aim of the present invention is to overcome the drawbacks of the aforementioned prior art and supply a nanostructured material of amorphous boron, said material consisting essentially of boron, unoxidized or with little oxidation, and having improved reactivity relative to the materials of the prior art.

Another aim of the invention is to supply a method for preparing a nanostructured material of amorphous boron, said method being economical, easy to carry out and able to give a material consisting essentially of boron, unoxidized or with little oxidation, and having improved reactivity relative to the materials of the prior art.

These aims are achieved by the invention, which will be described below.

Therefore the first object of the invention is a nanostructured material consisting essentially of boron, characterized in that it is in amorphous form and that it comprises aggregates of boron nanoparticles with a size less than or equal to about 25 nm, preferably ranging from about 1 to 20 nm, and more preferably ranging from about 2 to 10 nm.

Thus, the nanoparticles of the material of the invention have a size that is less than or equal to about 25 nm, preferably ranging from about 1 to 20 nm, and more preferably ranging from about 2 to 10 nm. These sizes are smaller than those of the commercial amorphous boron and of the amorphous boron materials described in the prior art, and lead to improved reactivity.

In the sense of the present invention, a nanostructured material is a material made up of aggregated nanoparticles, and therefore possessing an internal structure on the nanometric scale. In this sense, the material of the invention complies with the definition of a nanostructured material of the International Organization for Standardization.

In the present invention, the size of the boron nanoparticles was measured by transmission electron microscopy (TEM).

In the present invention, the expression "aggregates of nanoparticles" denotes aggregates whose chemical composition at the scale of the aggregate is identical from one aggregate to another, each of the aggregates representing an assemblage (or a set) of nanoparticles bound together covalently by boron-boron bonds.

In one embodiment of the invention, the size distribution of the aggregates in a dispersion measured by dynamic light scattering, notably with equipment marketed under the reference Zetasizer Nano ZS by the company Malvern Instruments, is between about 40 nm and 200 nm, preferably between 50 nm and 150 nm, and more preferably centred around 70 nm.

The material of the invention consists essentially of boron, i.e. it consists of at least about 85 mol % of boron, preferably at least about 90 mol % of boron, more preferably at least about 95 mol % of boron, and more preferably at least about 97 mol % of boron, the remainder being inevitable impurities resulting from the method for producing said material and/or from its oxidation and/or from the equipment used in the production process (e.g. synthesis vessel).

The inevitable impurities resulting from the method for producing said material may be one or more halogen atoms and/or alkali metal atoms, such as one or more of the following elements: Li, Na, K, Rb, Cs, I, Cl, Br, F.

The inevitable impurity resulting from the oxidation of said material is oxygen. It is present in the form of $BO_3$ or $BO_4$ chemical groups, in oxidized boron compounds such as $B_2O_3$ or $B(OH)_3$. The inevitable impurities in the material of the invention preferably comprise at most about 5 mol % of oxygen, and more preferably at most about 3 mol % of oxygen (i.e. the material comprises at most about 5 mol % of oxygen, and more preferably at most about 3 mol % of oxygen).

The inevitable impurities derived from the equipment used in the production process may be carbon.

The inevitable impurities derived from the equipment used in the process for producing the material of the invention preferably comprise at most about 4 mol % of carbon, and more preferably at most about 1 mol % of carbon (i.e. the material comprises at most about 4 mol % of carbon, and more preferably at most about 1 mol % of carbon).

According to a preferred embodiment of the invention, the material of the invention consists of about 90 to 100 mol % of boron, from about 0 to 5 mol % of oxygen and from about 0 to 5 mol % of inevitable impurities resulting from the method for producing said material and/or from the equipment used in the production process.

According to another preferred embodiment of the invention, the material of the invention consists of about 90 to 100 mol % of boron, from about 0 to 3 mol % of oxygen and from about 0 to 7 mol % of inevitable impurities resulting from the method for producing said material and/or from the equipment used in the production process.

The inevitable impurities derived from the method for producing the material of the invention may additionally contain hydrogen atoms, notably resulting from the presence of borane as an intermediate or starting product of the method as described hereunder (e.g. presence of boron-hydrogen bonds of the boranes).

The inevitable impurities derived from the method for producing the material of the invention preferably comprise at most about 10 mol % of hydrogen, and more preferably do not comprise hydrogen (i.e. the material comprises at most about 10 mol % of hydrogen, and more preferably about 0 mol % of hydrogen). Thus, the material of the invention (obtained according to the method as described in detail hereunder) preferably does not comprise boranes such as diborane $B_2H_6$.

In the present invention, the expression "nanostructured material consisting essentially of boron in amorphous form" means that the boron constituting the material of the invention is amorphous, i.e. it is not crystalline, or that its X-ray diffraction pattern does not have a crystalline signature. In other words, its X-ray diffraction pattern shows the presence of a halo and the absence of diffraction peaks.

In other words, the material of the invention is a nanostructured material consisting essentially of boron comprising aggregates of boron nanoparticles with a size less than or equal to about 25 nm, preferably ranging from about 1 to 20 nm, and more preferably ranging from about 2 to 10 nm, said boron being in amorphous form.

The constituents (atoms, molecules or ions) of the amorphous material of the invention do not conform to any medium-range and long-range order. This makes it possible to distinguish it from a crystalline material, in which the constituents are assembled regularly.

According to an advantageous embodiment of the invention, the material has a specific surface area $S_{BET}$ of at least about 500 $m^2 \cdot g^{-1}$, preferably of at least about 700 $m^2 \cdot g^{-1}$, and more preferably of at least about 800 m²·g⁻¹, said specific surface area $S_{BET}$ being calculated by the BET method (i.e. the method of Brunauer, Emmett and Teller, 1938).

The material of the present invention is a porous material. It may therefore have a porosity of at least about 50% and preferably of at least about 60%.

In one embodiment of the present invention, the material has a density in the range from 1.1 to 2.3, and preferably in the range from about 1.2 to 1.6, said density being measured with a helium pycnometer, notably with equipment marketed under the reference Ultrapyc 1200e by the company Quantachrome Instruments.

The boron nanoparticles of the material of the invention are preferably spherical.

The nanostructured amorphous boron material of the invention has excellent purity, with little or no oxidation. Furthermore, it has a larger specific surface area and a lower density than the amorphous boron of the prior art, producing a significant improvement in its reactivity, notably in the synthesis of metal borides.

The second object of the invention is a method for preparing a nanostructured material consisting essentially of boron as defined in the first object of the invention, characterized in that it comprises at least one step i) of heating a mixture comprising at least one boron hydride and at least one inorganic salt under an inert atmosphere, step i) being carried out at a temperature $T_s$ sufficient to decompose said boron hydride and so that said salt is at least partially in the molten state.

The method of the invention is simple and economical. It is based on the decomposition, in one or more inorganic salts, of at least one boron hydride to amorphous elemental boron at a temperature $T_s$ allowing partial or complete fusion of said salts as well as said decomposition.

It should be noted that the decomposition temperature of a boron hydride depends on the medium in which it decomposed.

In the present invention, the term "inert atmosphere" means a non-oxidizing atmosphere, thus avoiding oxidation of the boron, and/or an unreactive atmosphere, avoiding for example the formation of boron nitride.

In the present invention, the term "temperature $T_s$ sufficient for said salt to be at least partially in the molten state" means that the temperature $T_s$ must be greater than or equal to the melting point $T_{fs}$ of said salt (when a single inorganic salt is used). In the case when the mixture comprises several inorganic salts, the temperature $T_s$ must be greater than or equal to the temperature of the start of fusion of said mixture.

The temperature of the start of fusion of the mixture is the melting point $T_{fe}$ of the eutectic when the mixture of the inorganic salts has a eutectic point.

Furthermore, it should be noted that when a mixture of inorganic salts that has a eutectic point is used, at least one part of the mixture will begin to melt at a melting point $T_{fe}$, even if a eutectic mixture of said salts is not used.

When the mixture comprises several inorganic salts and has a eutectic point, the composition of the mixture of said several inorganic salts is generally selected so as to form a eutectic.

However, the composition of the mixture may be different from that allowing formation of a eutectic.

In the present invention, the term "temperature $T_s$ sufficient to decompose said boron hydride" means that the temperature $T_s$ must be greater than or equal to the decomposition temperature $T_d$ of the boron hydride in the inorganic salt or the mixture of inorganic salts at least partially in the molten state.

In fact, if the temperature $T_s$ is greater than or equal to the melting point of the inorganic salt $T_{fs}$ but still below the decomposition temperature of the boron hydride $T_d$ in said inorganic salt, the material obtained at the end of step i) is not according to the invention, notably it does not comprise aggregates of boron nanoparticles with a size of at most about 25 nm. Moreover, its specific surface area is far lower and it is partly oxidized, which impairs its reactivity.

The melting point of the inorganic salt $T_{fs}$ or the temperature of the eutectic of the mixture of inorganic salts $T_{fe}$ or the temperature of the start of fusion of the mixture of inorganic salts, preferably ranges from about 200 to 800° C., and more preferably from about 250 to 700° C.

According to a preferred embodiment of the invention, the temperature $T_s$ is sufficient to decompose said boron hydride and for the inorganic salt or the mixture of inorganic salts to be completely in the molten state.

In a particular embodiment, step i) is carried out under an argon or helium atmosphere.

Step i) may be carried out in a vessel (e.g. crucible) based on vitreous carbon, boron nitride or molybdenum.

As an example, the vessel is a crucible made of vitreous carbon, boron nitride (e.g. >99 mol % of boron nitride) or a mixture of boron nitride and silica (e.g. 60 mol % of boron nitride and 40 mol % of silica).

The method may further comprise a step $i_0$) before step i), of mixing at least one boron hydride with at least one inorganic salt, said salt and said boron hydride being in the solid state (e.g. in the form of powders).

Mixing may be carried out manually, notably using a mortar, mechanically, notably using a ball mill, by means of ultrasound, or by preliminary dispersion in a liquid that is unreactive with respect to the inorganic salt and the boron hydride, said liquid then being removable by filtration, centrifugation or evaporation.

Mechanical mixing is preferred.

The method may further comprise a step $i_{0-1}$) of transfer, under an inert atmosphere, of the mixture from step $i_0$) to a vessel as defined in the invention.

The inorganic salt or salts at least partially in the molten state perform the role of solvent of the boron hydride in step i). Thus, the amount of inorganic salts in the mixture from step i) is preferably sufficient to allow dispersion of the particles resulting from the decomposition of the boron hydride.

Consequently, the mixture preferably comprises from about 0.1 to 20 wt % of the boron hydride and from about 80 to 99.9 wt % of inorganic salts.

The mixture from step i) preferably does not comprise other solvent(s) than said inorganic salts.

Step i) is carried out for a time ranging from about 1 minute to 10 hours, notably in order to allow complete decomposition of the boron hydride and to lead to the material of the invention at a good yield.

The boron hydride may be selected from the boranes and the alkali metal borohydrides.

The heating temperature $T_s$ in step i) is preferably from about 600 to 1000° C., more preferably from about 700 to 1000° C., and more preferably from about 800 to 1000° C.

As examples of boranes suitable for the method of the present invention, we may mention decaborane $B_{10}H_{14}$ or dodecaborane $B_{12}H_{12}^{2-}$, which may be used in the form of potassium dodecaborane ($K_2B_{12}H_{12}$).

As examples of alkali metal borohydrides suitable for the method of the present invention, we may mention $LiBH_4$, $NaBH_4$ or $KBH_4$.

The boron hydride is preferably an alkali metal borohydride.

The inorganic salt may be an alkali metal halide, such as LiI, LiCl, LiBr, LiF, KI, KCl, KBr, KF, NaI, NaCl, NaBr, NaF, RbI, RbBr, RbCl, RbF, CsI, CsBr, CsCl or CsF, and preferably such as LiI, LiCl, NaI, NaCl, KI or KCl.

Preferably, the inorganic salt does not comprise oxygen, so as to avoid any possible oxidation of the boron while carrying out the method of the invention.

The mixture from step i) preferably comprises one or two inorganic salts such as those mentioned above.

In a particular embodiment, the boron hydride is $NaBH_4$ and the mixture comprises two inorganic salts KI and LiI, or the boron hydride is $NaBH_4$ and the inorganic salt is NaI, or the boron hydride is $LiBH_4$ and the mixture comprises two inorganic salts LiI and LiCl.

The mixture from step i) preferably comprises only one or more boron hydrides and one or more inorganic salts, in order to avoid any side reaction that may reduce the amount of material of the invention formed.

The method may advantageously further comprise a step ii) of cooling the mixture obtained at the end of step i). Cooling in fact makes it possible to reach a temperature below the solidification temperature of the mixture obtained at the end of step i). Cooling is generally carried out to room temperature (e.g. about 20-25° C.).

The method may further comprise a step iii) of purification of the mixture obtained at the end of step i) or step ii).

Step iii) preferably comprises washing said mixture with a solvent that makes it possible to dissolve the salts that remain or were formed in step i); and separation, notably by filtration and/or centrifugation, of the material of the invention from said salts dissolved in said solvent.

The solvent used is preferably water free from dissolved oxygen and saturated with an inert gas, notably selected from argon and nitrogen or an organic (i.e. non-aqueous) solvent, in particular non-oxidizing, notably selected from alcohols, ethers and any other solvent making it possible to dissolve the salts that remain or were formed in step i), as well as any impurities.

The method may further comprise a step iv) of drying the material from step iii), notably under vacuum.

Step iv) may be carried out at a temperature in the range from about 0° C. to 100° C., and preferably from about 20° C. to 40° C.

The method may further comprise a step v) of storing the material obtained in step iv) away from the air, for example under an inert argon, nitrogen or helium atmosphere or under vacuum.

A third object of the invention is the use of a nanostructured material consisting essentially of boron as defined in the first object of the invention or obtained by the method as defined in the second object of the invention, for storage of dihydrogen.

A fourth object of the invention is the use of a nanostructured material consisting essentially of boron as defined in the first object of the invention or obtained by the method as defined in the second object of the invention, as a precursor for the synthesis of boron compounds, and notably of crystalline materials based on boron, such as metal borides (e.g. $MgB_2$).

A fifth object of the invention is the use of a nanostructured material consisting essentially of boron as defined in the first object of the invention or obtained by the method as defined in the second object of the invention, as a catalyst.

A sixth object of the invention is the use of a nanostructured material consisting essentially of boron as defined in the first object of the invention or obtained by the method as defined in the second object of the invention, as an additive with high energy density in hypergolic liquids or solids, explosives or fuels, notably in the field of space propulsion.

EXAMPLES

The raw materials used in the examples are listed below:
Lithium iodide, Alfa Aesar, of 99% purity,
Sodium iodide, Alfa Aesar, of 99.9% purity,
Potassium iodide, Alfa Aesar, of 99% purity,
Lithium chloride, Alfa Aesar, of 99.995% purity,
Sodium borohydride, Alfa Aesar, of 98% purity,
Lithium borohydride, Alfa Aesar, of 95% purity,
Magnesium, Sigma Aldrich, of 99% purity,
Commercial boron oxide $LiBO_2$ ($M'_{01}$), $2H_2O$, Sigma Aldrich, purity ≥98.0%, and
Commercial amorphous boron ($M'_{02}$), ABCR, of 95-97% purity.

Unless stated otherwise, all the materials were used as received from the manufacturers.

The materials, prepared or commercial, were characterized by:
X-ray diffraction (XRD) to verify the amorphous nature and check that no crystalline impurity is present,
nuclear magnetic resonance (NMR) to determine the presence of oxygen and the quantitative nature of the synthesis,
scanning electron microscopy coupled to energy-dispersed X-ray analysis (SEM-EDX) (quantitative elemental analysis),
adsorption-desorption of nitrogen to determine their specific surface area by the BET method, and
transmission electron microscopy (TEM) to evaluate the morphology of the nanoparticles and/or aggregates.

The specific surface area was evaluated using apparatus sold under the trade name Belsorp max, by the company Bel Japan.

Analysis by transmission electron microscopy (TEM) was performed using apparatus sold under the trade name Tecnai spirit G2, by the company FEI.

The nuclear magnetic resonance analyses of boron were performed using apparatus sold under the trade name AV700, by the company Bruker, with the following parameters: magnet 16.4 T, rotation of the sample at 20 kHz about the magic angle.

The X-ray diffraction analyses were performed using apparatus sold under the trade name D8p, by the company Bruker.

The energy-dispersed X-ray analyses for elemental assay of the samples were performed using a scanning electron microscope sold under the trade name (S-3400-N), by the company (Hitachi), equipped with an EDX detector sold under the name X-max by the company Oxford Instruments.

DETAILED DESCRIPTION

Example 1: Preparation of a Nanostructured Material Consisting Essentially of Boron $M_1$ According to the First Object of the Invention and Comparison with Materials not According to the Invention $M'_1$, $M'_2$, $M'_3$ and $M'_4$ 606 mg of sodium borohydride ($NaBH_4$) was mixed with 5.8 g of lithium iodide (LiI) and 4.2 g of potassium iodide (KI) for about 2 minutes in a ball mill marketed under the reference MM400 by the company Retsch, to obtain a homogeneous fine powder.

The melting point of the LiI/KI eutectic mixture (LiI/KI weight ratio of 58/42) as used is about 286° C.

The resultant mixture was transferred under an inert atmosphere (argon) to a vessel made of vitreous carbon, it was heated under an inert atmosphere (argon) at a temperature of about 800° C. for about 1 hour, and was then cooled to room temperature to solidify.

The resultant mixture was washed several times with methanol by successive centrifugations in order to dissolve the salts that remained or had formed, and remove them. The moist powder obtained was dried under vacuum at about 40° C. for about 2 hours to give the material $M_1$. The material $M_1$ was then stored under an argon atmosphere.

The same method was repeated, but changing the heating temperature of 800° C. Temperatures of about 400, 500, 550 and 600° C. were used, giving respectively the materials $M'_1$, $M'_2$, $M'_3$ and $M'_4$.

Table 1 below shows the characteristics of the materials $M_1$, $M'_1$, $M'_2$, $M'_3$ and $M'_4$ obtained depending on the heating conditions, namely the specific surface area $S_{BET}$ (in $m^2 \cdot g^{-1}$), the composition of starting products and/or reaction intermediates and/or contaminants (by $^{11}B$ NMR analysis) and the molar proportions of the different elements (by SEM-EDX analysis).

TABLE 1

| Material | T (° C.) | $S_{BET}$ ($m^2 \cdot g^{-1}$) | Presence of starting products, intermediates or contaminants | Analysis by SEM-EDX mol % of the elements | | | | |
|---|---|---|---|---|---|---|---|---|
| | | | | % B | % O | % K | % Na | % I |
| $M_1$ | 800 | 860 | Traces of $BO_3$ and $BO_4$ | >94.9 | 0.0 | 4.2 | <0.7 | <0.2 |
| $M'_1$ (*) | 400 | NM | $BO_3$, $BO_4$, $M_2B_{12}H_{12}$ and $MBH_4$ (M = Li, Na or K) | | | NM | | |
| $M'_2$ (*) | 500 | NM | $BO_3$, $BO_4$, $M_2B_{12}H_{12}$ and $MBH_4$ (M = Li, Na or K) | | | NM | | |
| $M'_3$ (*) | 550 | NM | Traces of $BO_3$ $BO_4$, $M_2B_{12}H_{12}$ (M = Li, Na or K) | >82.4 | 7.6 | 9.5 | <0.4 | <0.1 |
| $M'_4$ (*) | 600 | 25 | Traces of $BO_3$ $BO_4$, $M_2B_{12}H_{12}$ (M = Li, Na or K) | >89.4 | 0.5 | 9.7 | <0.4 | 0.0 |

(*) Materials not forming part of the invention
NM: parameter not measured

Table 1 shows firstly that the material $M_1$ has a specific surface area $S_{BET}$ of about 860 $m^2 \cdot g^{-1}$, whereas the material $M'_4$ has a specific surface area of only about 25 $m^2 \cdot g^{-1}$.

Figure 1:
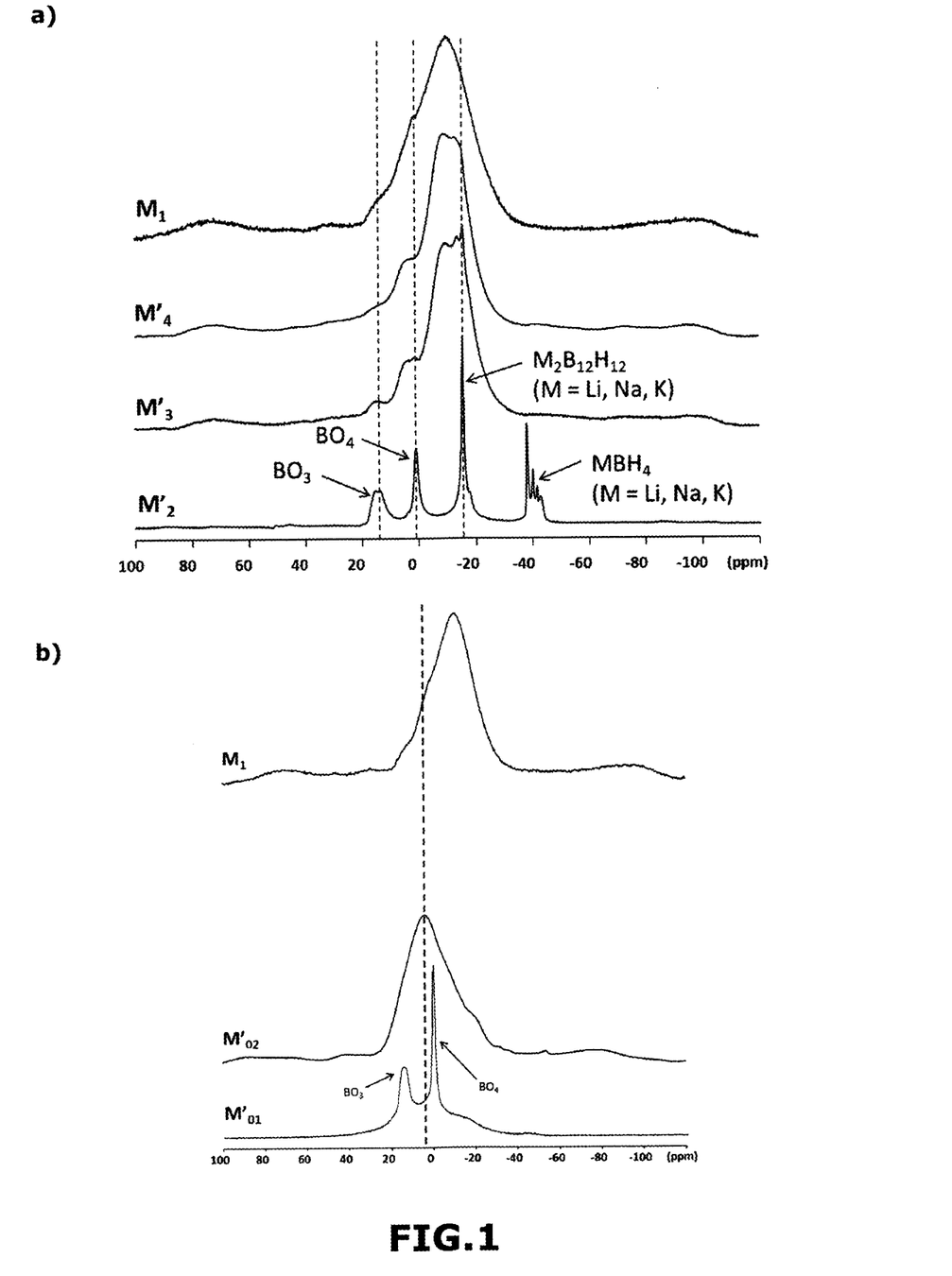
FIGS. 1a and 1b are NMR analyses from Example 1 in accordance with one embodiment.

$^{11}B$ NMR analysis of the materials $M_1$, $M'_2$, $M'_3$ and $M'_4$ as prepared above was performed (cf. FIG. 1a) as well as of the material $M_1$ and by comparison with the commercial boron oxide $M'_{o1}$ and the commercial amorphous boron $M'_{o2}$ (cf. FIG. 1b).

More particularly, $^{11}B$ NMR analysis of the material $M_1$ showed the presence of a broad single peak, as well as very weak signals corresponding to the oxidized boron derivatives $BO_4$ and $BO_3$. The product obtained directly from the process (i.e. before NMR analysis) comprises even less oxygen than is seen by NMR since characterization of the samples for the NMR analyses involves confinement in a rotor that is not perfectly hermetic. In these conditions, slight exposure to the ambient air for about 15 minutes, and therefore possible oxidation of the boron, is probable. According to the NMR analysis, the material $M_1$ obtained does not comprise starting product and/or intermediates of the reaction of decomposition of the alkaline borohydrides that may possibly form during heating, such as $M_2B_{12}H_{12}$ and $MBH_4$ (with M=Li, Na or K).

$^{11}B$ NMR analysis of the material $M'_{01}$ is a reference for positioning the signature of the oxidized groups $BO_3$ and $BO_4$ in an $^{11}B$ NMR spectrum.

$^{11}B$ NMR analysis of the material $M'_{02}$ (commercial amorphous boron) showed the presence of $BO_3$ groups, as well as a distribution of chemical shifts different from that of $M_1$, reflecting different B-B environments in $M'_{02}$ and $M_1$, and therefore differences in short-range order.

However, when the heating temperature is 400° C., 500° C. or 550° C., $NaBH_4$ did not decompose completely to amorphous boron, as demonstrated by the presence, according to boron $^{11}B$ NMR, of $MBH_4$ and/or $M_2B_{12}H_{12}$ (with M=Li, Na or K) in the materials $M'_1$, $M'_2$ and $M'_3$.

At 600° C., the $^{11}B$ NMR signal is made up of multiple broad peaks. The NMR signature of $M_2B_{12}H_{12}$ is still present in the material $M'_4$, although faintly discernible in the form of a shoulder of the broadest peak corresponding to amorphous boron.

Furthermore, analysis by SEM-EDX showed that potassium is still well represented in the materials $M'_3$ and $M'_4$ (about 9.5 mol % and about 9.7 mol %, respectively), notably owing to the presence of $K_2B_{12}H_{12}$.

Figure 2:
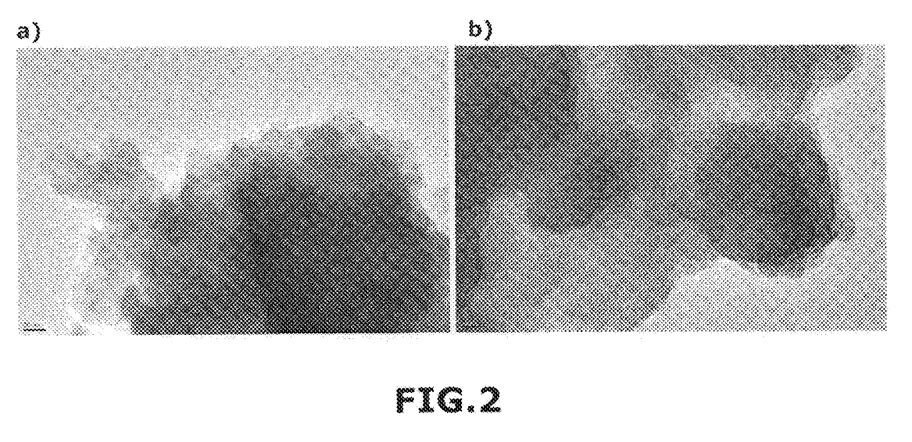
FIGS. 2a and 2b are TEM analyses from Example 1 in accordance with one embodiment.

TEM analysis of the material $M'_4$ (cf. FIG. 2a: scale 20 nm, FIG. 2b: scale 10 nm) showed the presence of aggregates of amorphous boron with smoothed contours. It is not possible to discern the nanoparticles making up the clusters or aggregates. This TEM observation is consistent with the low value of the specific surface area of said material $M'_4$, itself evidence of the absence of intergranular porosity in said material $M'_4$.

Figure 3:
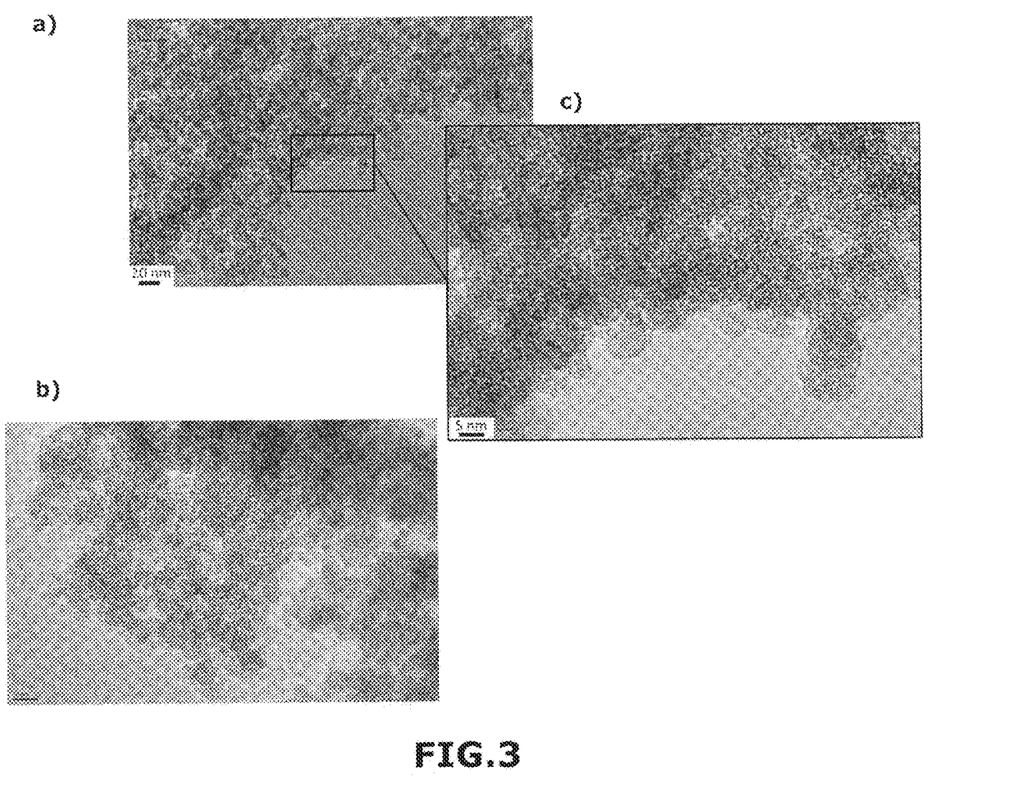
FIGS. 3a, 3b, and 3C are TEM analyses from Example 1 in accordance with one embodiment.

For comparison, TEM analysis of the material $M_1$ (FIG. 3a: scale 20 nm, FIG. 3b: scale 10 nm, FIG. 3c: scale 5 nm) clearly showed the presence of aggregates of nanoparticles smaller than about 20 nm.

Figure 4:
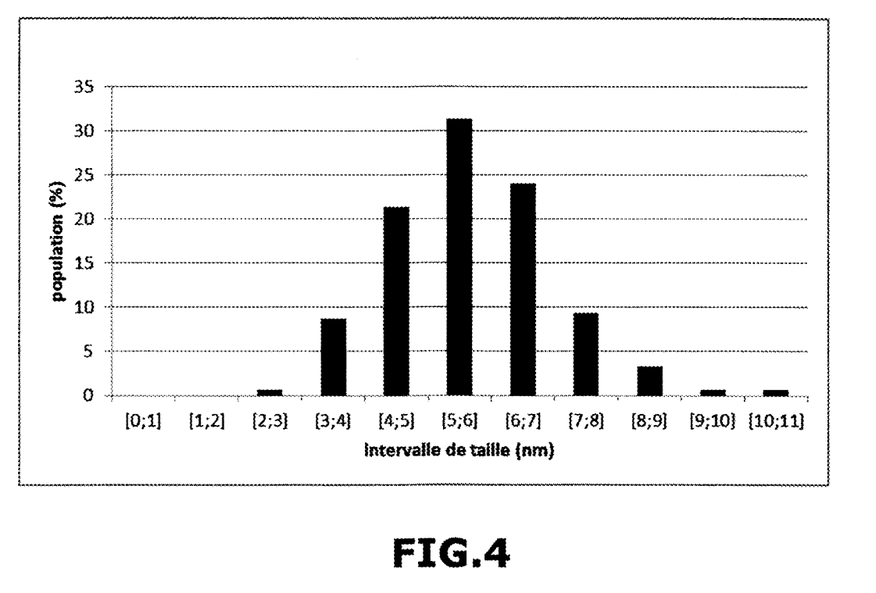
FIG. 4 is a distribution chart of size measurements from Example 1 in accordance with one embodiment

FIG. 4 shows the distribution of the size of the nanoparticles in the material $M_1$, the calculation having been based on 150 measurements of size obtained from TEM images on several regions of different aggregates. Thus, the material $M_1$ according to the invention comprises aggregates of nanoparticles ranging in size from about 2 to 10 nm, and notably with an average size of about 5.6 nm.

Measurement of density of the material $M_1$ with a helium pycnometer showed that the material has an apparent density of $1.33\pm0.03$ g·cm$^{-3}$.

The calculated specific surface area $S_{calculated}$ for a perfectly smooth spherical particle with a diameter of 5.6 nm and a density of 1.33 g·cm$^{-3}$ is 810 m$^2$·g$^{-1}$. This value is consistent with the specific surface area $S_{BET}$ measured on the material $M_1$.

Figure 5:
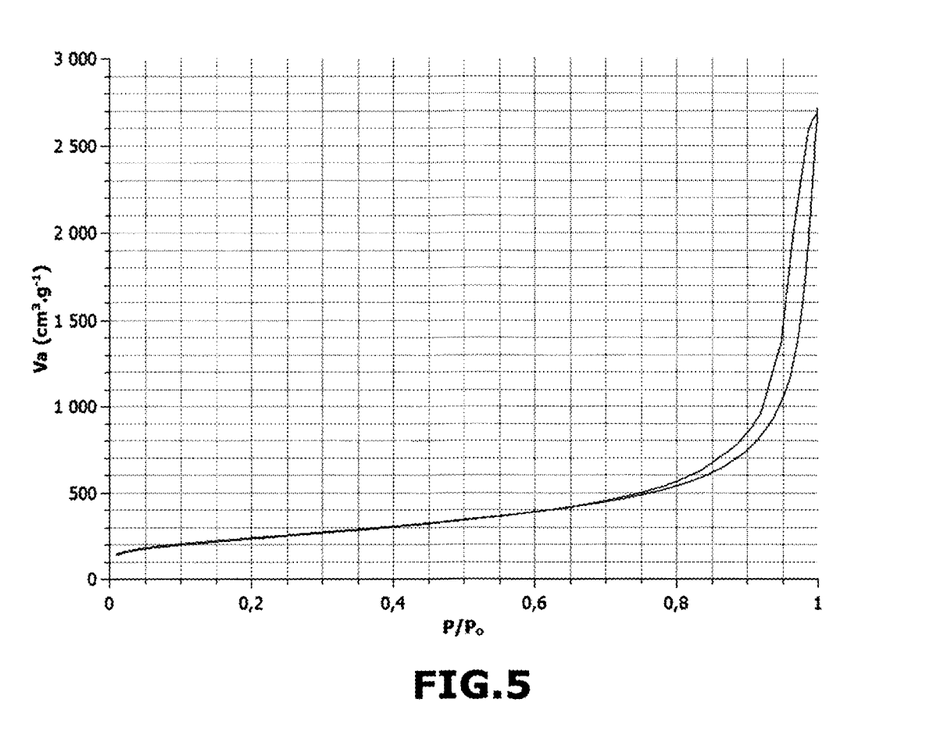
FIG. 5 is a nitrogen adsorption and desorption isotherms from Example 1 in accordance with one embodiment

The nitrogen adsorption and desorption isotherms of the material $M_1$ (cf. FIG. 5) showed the presence of mesopores formed by the intergranular spaces between the nanoparticles.

Figure 6:
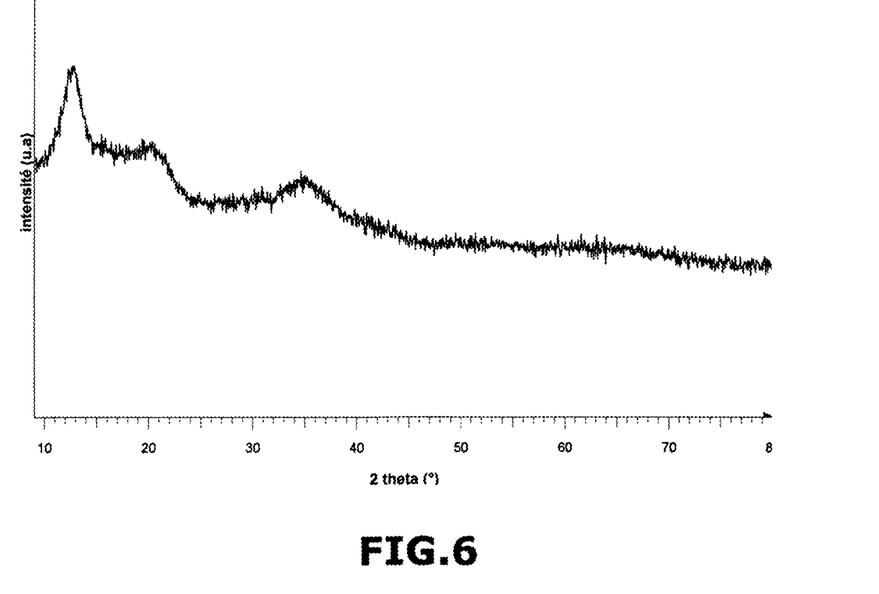
FIG. 6 is an X-ray diffraction analysis from Example 1 in accordance with one embodiment

X-ray diffraction analysis of the material $M_1$ (FIG. 6) showed the amorphous phase of boron, since no peak is present (i.e. phase without long-range order). The broad peaks at low angles are due to scattering of the X-rays when they pass through the dome under which the powder is stored, away from the ambient air.

In conclusion, in all the tests in this example 1, the heating temperature used was above the melting point of the eutectic (i.e. 286° C.), thus allowing the mixture of inorganic salts to be in the molten state. However, use of a temperature that is too low, for example less than or equal to 600° C., does not allow the boron hydride (i.e. $NaBH_4$) to be decomposed completely, and therefore cannot give a material according to the invention, i.e. comprising aggregates of boron nanoparticles with a size of at most about 25 nm, the boron being in amorphous form.

It should be noted that in this example 1, a temperature of 600° C. is not sufficient to decompose $NaBH_4$ completely when it is reacted with lithium iodide and potassium iodide in proportions as described above. However, this sufficient temperature $T_s$ depends both on the inorganic salt used (i.e. its melting point or softening point), whether it is mixed with other inorganic salts, the decomposition temperature of the boron hydride used, etc.

Consequently, a temperature of 600° C. might be sufficient if the reaction is carried out with some other boron hydride mixed with identical inorganic salts, or with an identical boron hydride mixed with one or more different inorganic salts, or with some other boron hydride mixed with one or more different inorganic salts.

Example 2: Preparation of a Nanostructured Material Consisting Essentially of Boron $M_2$ According to the First Object of the Invention and Comparison with a Material not According to the Invention M's 174 mg of lithium borohydride ($LiBH_4$) was mixed with 0.76 g of lithium chloride (LiCl) and 4.24 g of lithium iodide (LiI) for about 2 minutes in a ball mill such as that used in example 1, to obtain a homogeneous fine powder.

The melting point of the LiCl/LiI eutectic mixture as used is about 371° C.

The resultant mixture was transferred under an inert atmosphere (argon) to a vessel made of vitreous carbon, it was heated under an inert atmosphere (argon) at a temperature of about 800° C. for 1 hour, and was then cooled to room temperature to solidify.

The resultant mixture was washed several times with methanol by successive centrifugations in order to dissolve the salts that remained and had formed, and remove them. The moist powder obtained was dried under vacuum at about 40° C. for about 2 hours to give the material $M_2$. The material $M_2$ was then stored under an argon atmosphere.

The same method was repeated, but changing the heating temperature of 800° C. to a temperature of about 550° C., giving the material $M'_5$.

Table 2 below shows the characteristics of the materials $M_2$ and $M'_5$ obtained according to the heating conditions, namely the specific surface area $S_{BET}$ (in m$^2$·g$^{-1}$), the composition of starting products and/or reaction intermediates and/or contaminants (by $^{11}B$ NMR analysis) and the molar proportions of the different elements (by SEM-EDX analysis).

TABLE 2

| Material | T (° C.) | $S_{BET}$ (m$^2 \cdot$g$^{-1}$) | Presence of starting products, intermediates or contaminants | Analysis by SEM-EDX mol % of the elements | | |
|---|---|---|---|---|---|---|
| | | | | % B | % O | % I |
| M$_2$ | 800 | 900 | — | >98.3 | 1.6 | <0.1 |
| M'$_5$ (*) | 550 | NM | traces of BO$_3$ and BO$_4$ Li$_2$B$_{12}$H$_{12}$ and LiBH$_4$ | NM | NM | NM |

(*) Materials not forming part of the invention
NM: parameter not measured

Table 2 shows firstly that the material M$_2$ has a specific surface area $S_{BET}$ of about 900 m$^2 \cdot$g$^{-1}$.

Figure 7:
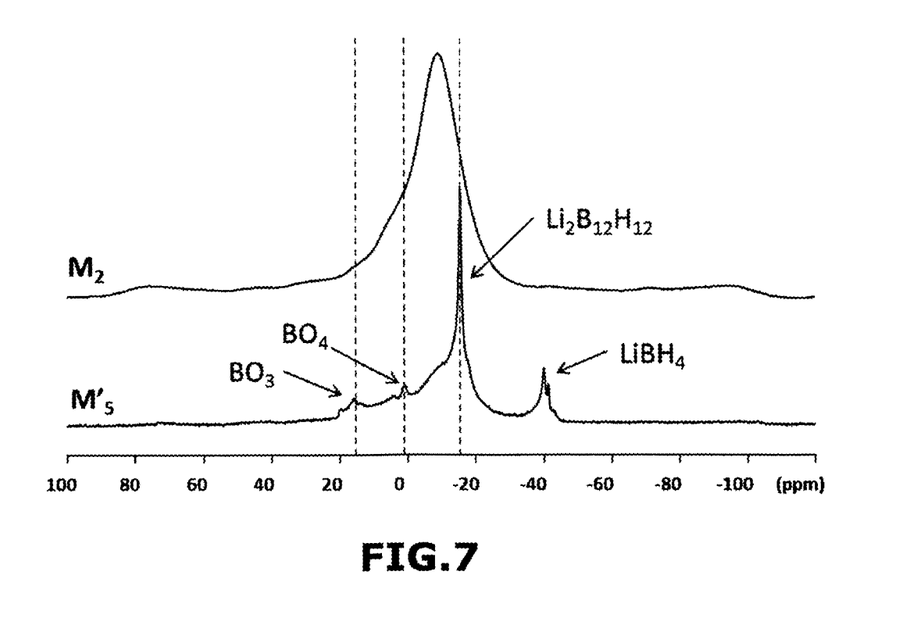
FIG. 7 is an NMR analysis from Example 2 in accordance with one embodiment.

$^{11}$B NMR analysis of the materials M$_2$ and M'$_5$ was undertaken (cf. FIG. 7).

In particular, $^{11}$B NMR analysis of the material M$_2$ showed the presence of a broad single peak. No signal corresponding to oxidation of the boron to oxidized boron derivatives BO$_4$ and BO$_3$ was present. The material M$_2$ therefore does not comprise the starting product and/or the intermediate of the reaction of decomposition of the alkaline borohydrides that may possibly form during heating, such as Li$_2$B$_{12}$H$_{12}$ and LiBH$_4$.

However, when the heating temperature was about 550° C., LiBH$_4$ was not decomposed to amorphous boron completely, as demonstrated by the presence, according to $^{11}$B boron NMR, of LiBH$_4$ and Li$_2$B$_{12}$H$_{12}$ in the material M''s.

Figure 8:
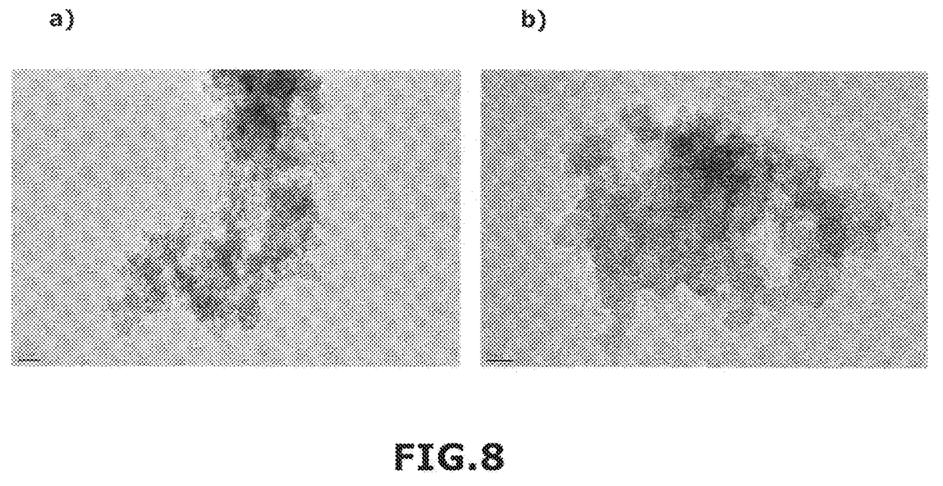
FIGS. 8a and 8b are TEM analyses from Example 1 in accordance with one embodiment.

TEM analysis of the material M$_2$ (FIG. 8a: scale 20 nm, FIG. 8b: scale 10 nm) showed morphology of the material M$_2$ very similar to that observed for the material M$_1$, with very similar sizes of nanoparticles (smaller than about 20 nm). This TEM observation is consistent with the high value of the specific surface area of said material M$_2$, which is about 900 m$^2 \cdot$g$^{-1}$.

SEM-EDX analysis of the material M$_2$ showed that amorphous boron was obtained with purity above 98%. Lithium was not detected. The presence of oxygen might be due to oxidation during preparation of the sample for analysis by SEM-EDX (exposure to the air for about 1 minute).

In conclusion, in the tests in this example 2, the heating temperature used was above the melting point of the eutectic (i.e. 371° C.), thus allowing the mixture of inorganic salts to be in the molten state. However, use of a temperature that is too low, for example less than or equal to 550° C., does not allow the boron hydride (i.e. LiBH$_4$) to be decomposed completely, and therefore cannot give a material according to the invention, i.e. comprising aggregates of boron nanoparticles with a size of at most about 25 nm, the boron being in amorphous form.

Example 3: Preparation of a Nanostructured Material Consisting Essentially of Boron M$_3$ According to the First Object of the Invention and Comparison with a Material not According to the Invention M'$_6$ 303 mg of sodium borohydride (NaBH$_4$) was mixed with 5.00 g of sodium iodide (NaI) for about 2 minutes in a ball mill such as that used in example 1, to obtain a homogeneous fine powder.

The melting point of NaI is about 660° C.

The resultant mixture was transferred under an inert atmosphere (argon) to a vessel made of vitreous carbon, it was heated under an inert atmosphere (argon) at a temperature of about 800° C. for about 1 hour, and was then cooled to room temperature to solidify.

The resultant mixture was washed several times with methanol by successive centrifugations in order to dissolve the salts that remained and had formed, and remove them. The moist powder obtained was dried under vacuum at about 40° C. for about 2 hours to give the material M$_3$. The material M$_3$ was then stored under an argon atmosphere.

The same method was repeated, but changing the heating temperature of 800° C. to a temperature of about 600° C., to give the material M'$_6$.

Table 3 below shows the characteristics of the materials M$_3$ and M'$_6$ obtained according to the heating conditions, namely the specific surface area $S_{BET}$ (in m$^2 \cdot$g$^{-1}$), the composition of starting products and/or reaction intermediates and/or contaminants (by $^{11}$B NMR analysis) and the molar proportions of the different elements (by SEM-EDX analysis).

TABLE 3

| Material | T (° C.) | $S_{BET}$ (m$^2 \cdot$g$^{-1}$) | Presence of starting products, intermediates or contaminants | Analysis by SEM-EDX mol % of the elements | | | |
|---|---|---|---|---|---|---|---|
| | | | | % B | % O | % Na | % I |
| M$_3$ | 800 | 700 | traces of BO$_3$ and BO$_4$ | >90.1 | 4.3 | 5.4 | <0.2 |
| M'$_6$ (*) | 600 | 33 | BO$_3$, BO$_4$ and Na$_2$B$_{12}$H$_{12}$ | >82.2 | 7.6 | 9.5 | <0.7 |

(*) Materials not forming part of the invention

Table 3 shows firstly that the material M$_3$ has a specific surface area $S_{BET}$ of 700 m$^2 \cdot$g$^{-1}$, whereas the material M'$_6$ has a far lower specific surface area $S_{BET}$ of 33 m$^2 \cdot$g$^{-1}$.

Figure 9:
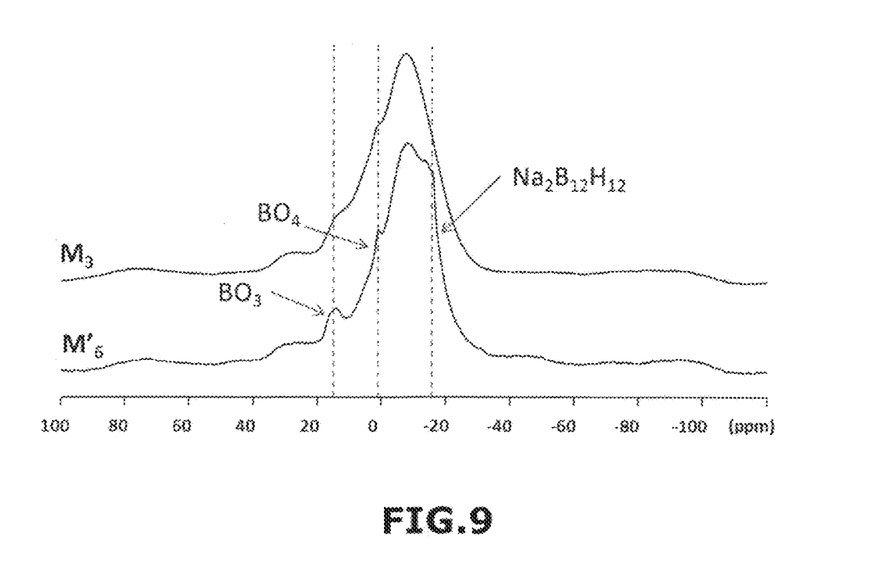
FIG. 9 is an NMR analysis from Example 3 in accordance with one embodiment.

$^{11}$B NMR analysis of the materials M$_3$ and M'$_6$ was undertaken (cf. FIG. 9).

In particular, $^{11}$B NMR analysis of the material M$_3$ showed the presence of a broad single peak. The material M$_3$ therefore does not comprise the starting product and/or intermediates of the reaction of decomposition of the alkaline borohydrides that may possibly form during heating, such as Na$_2$B$_{12}$H$_{12}$ and NaBH$_4$. Traces of chemical groups BO$_3$ and BO$_4$ were detected in the form of a shoulder of the main broad peak corresponding to amorphous boron, at the corresponding values of chemical shifts. These groups indicate slight oxidation, probably due to transfer of the powder to a rotor that is not hermetic, for NMR characterization, causing slight exposure to the ambient air for about 15 minutes.

However, when the heating temperature was about 600° C., NaBH$_4$ did not decompose completely to amorphous boron, as demonstrated by the presence, according to $^{11}$B boron NMR, of Na$_2$B$_{12}$H$_{12}$ in the material M'$_6$. The material M'$_6$ also comprises oxidized boron derivatives such as BO$_3$ and BO$_4$.

Figure 10:
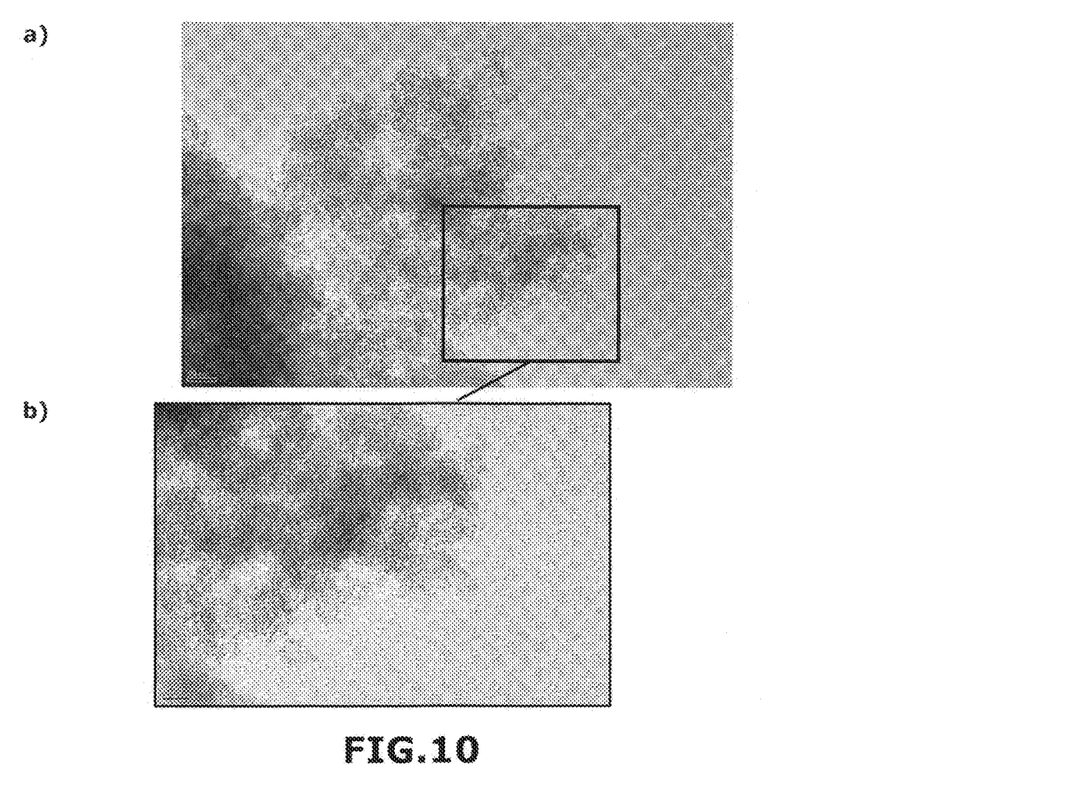
FIGS. 10a and 10b are TEM analyses from Example 3 in accordance with one embodiment.

TEM analysis of the material M$_3$ (FIG. 10a: scale 20 nm, FIG. 10b: scale 10 nm) showed morphology of the material M$_3$ very similar to that observed for the materials M$_1$ and M$_2$, with very similar sizes of nanoparticles (smaller than about 20 nm). This TEM observation is consistent with the high value of the specific surface area of said material M$_3$, which is about 700 m$^2 \cdot$g$^{-1}$.

SEM-EDX analysis of the material M$_3$ showed that amorphous boron with a purity of 90.1% was obtained. The presence of oxygen may be due to oxidation during preparation of the sample for SEM-EDX analysis (exposure to the air for about 15 minutes).

Figure 11:
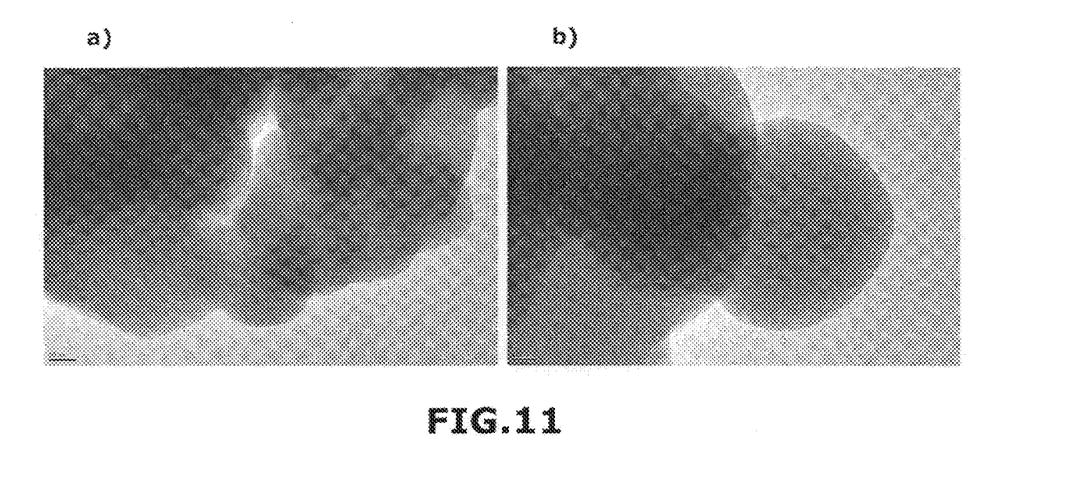
FIGS. 11a and 11b are TEM analyses from Example 3 in accordance with one embodiment.

For comparison, TEM analysis of M'$_6$ (FIG. 11a: scale 50 nm, FIG. 11b: scale 20 nm) showed smooth spherical particles, at least an order of magnitude larger than in molten medium. This observation explains the lower specific surface area obtained, of about 33 m$^2 \cdot$g$^{-1}$.

This example 3 provides evidence of the need to carry out the method of the invention (cf. step i)) in a medium that is at least partially molten, i.e. at a temperature $T_s$ at least greater than or equal to the melting point of the salt or of the eutectic, or the start of fusion of the mixture if several salts are used.

Furthermore, as was demonstrated in examples 1 and 2, the method of the invention must take place at a temperature $T_s$ sufficient to ensure complete decomposition of the borohydride to amorphous boron, which is not the case at 600° C., regardless of the medium envisaged. As a result, the properties of specific surface area and purity with respect to alkali metals are greatly decreased at a temperature T that is not sufficient to decompose said boron hydride and for said salt or mixture of salts to be at least partially in the molten state.

Although the purities are better with lithium salts (cf. examples 1 and 2), synthesis in a sodium salt medium may correspond to a good compromise between product quality (specific surface area and purity), ease of reuse of the salts, and cost of the chemical species involved.

Example 4: Use of the Nanostructured Material Consisting Essentially of Boron M$_1$ According to the First Object of the Invention and Comparison with the Use of a Commercial Material not According to the Invention for Preparing MgB$_2$ 30 mg of material M$_1$ as prepared in example 1 was mixed with 37 mg of magnesium (1.1 equivalents) in an autoclave, under an argon atmosphere. The resultant mixture was heated at about 500° C. for about 4 hours, in a sealed environment, under autogenous pressure. A fine black powder was recovered, and was stored under an inert argon atmosphere.

Figure 12:
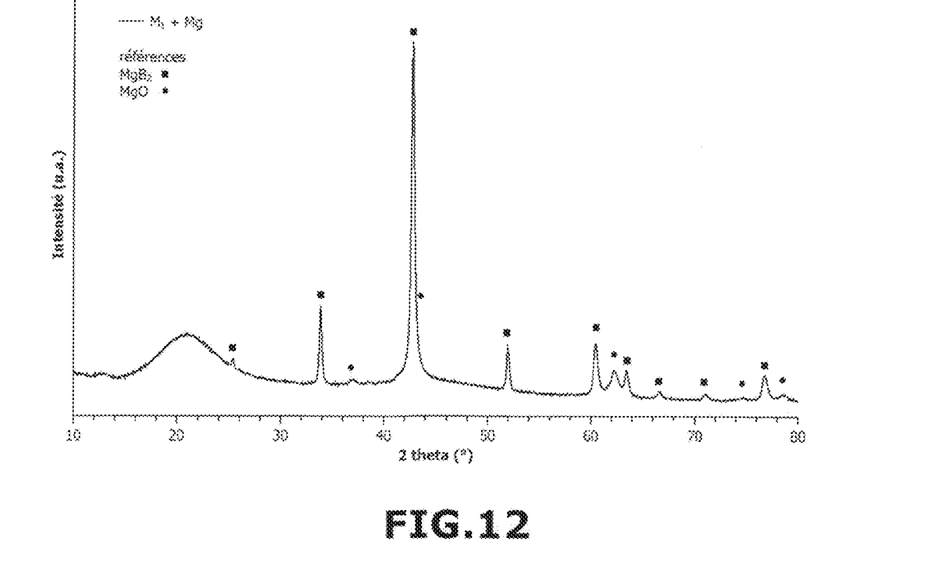
FIG. 12 is an X-ray diffraction analysis from Example 4 in accordance with one embodiment

X-ray diffraction (FIG. 12) was able to show the presence of a predominant crystalline phase MgB$_2$, and of a minor phase MgO in the material obtained. The width of the reflections of MgB$_2$ can be interpreted by a particle size effect. The apparent size of the crystal domains, calculated with Scherrer's formula, is about 40 nm. The apparent sizes of the crystal domains for the reflections of MgO are of about 20 nm.

Figure 13:
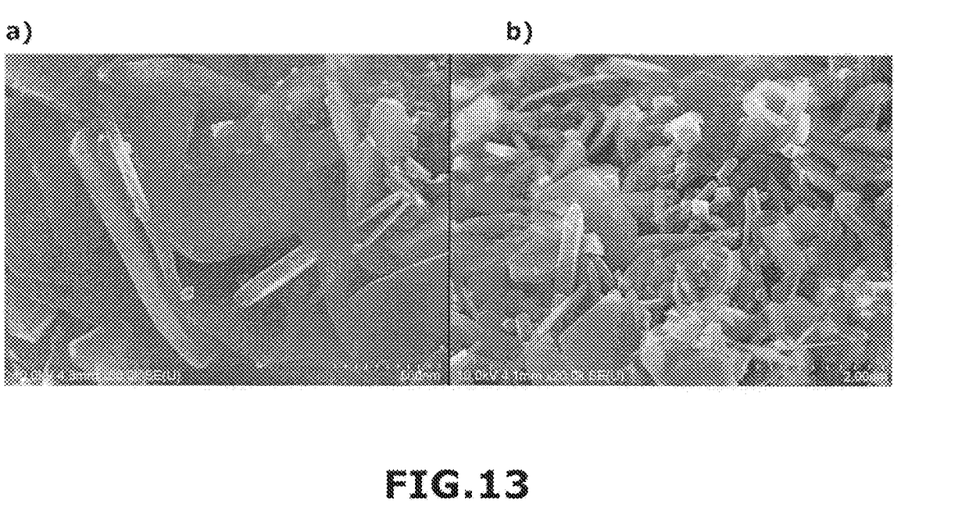
FIGS. 13a and 13b are electron microscopy images from Example 4 in accordance with one embodiment
Figure 14:
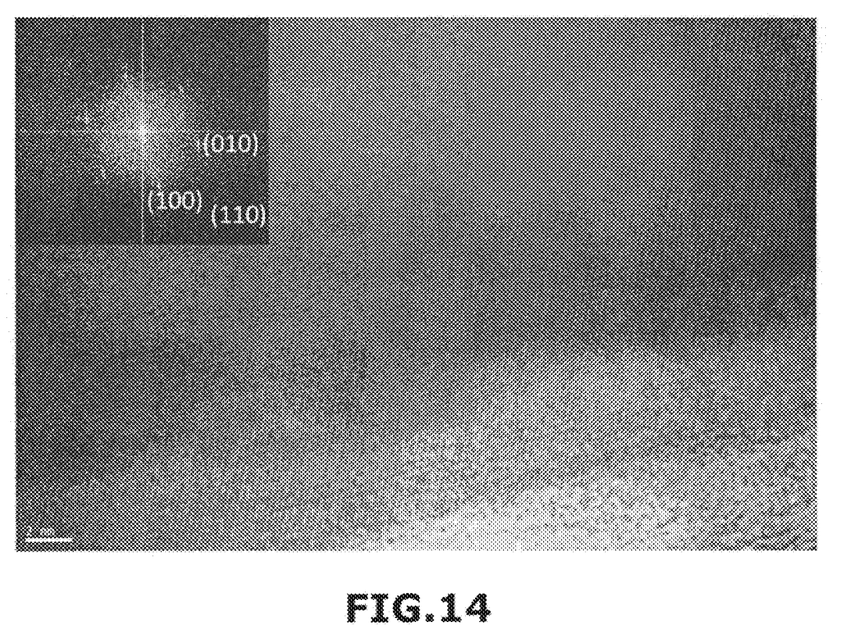
FIG. 14 is a high-resolution transmission electron microscopy image from Example 4 in accordance with one embodiment and FIG. 15 is an X-ray diffraction analysis from Example 4 in accordance with one embodiment.

The powder was observed by scanning electron microscopy (FIG. 13a: scale 500 nm, FIG. 13b: scale 2 µm). The particles of MgB$_2$ assume a morphology in the form of hexagonal platelets with a thickness ranging from about 50 to 100 nm, and with a length from about 500 nm to 1 µm. The chemical nature of the platelets was confirmed by high-resolution transmission electron microscopy (FIG. 14), which shows the hexagonal structure of MgB$_2$, with interplanar distances corresponding to the (100), (010), and (110) planes (cf. Fourier transform in FIG. 14 as insert in the same figure). Observation of a platelet along the slice also made it possible to observe the (001) planes of MgB$_2$ (data not supplied).

The same method was then repeated using a commercial amorphous boron material M'$_{02}$ identical to that used in example 1.

Figure 15:
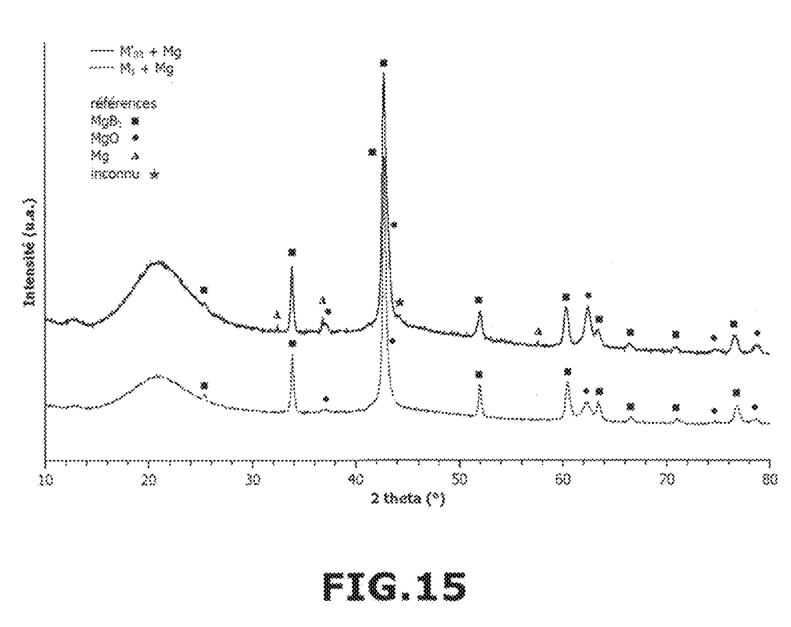

The X-ray diffraction patterns of the two powders, synthesized starting from materials M$_1$ and M'$_{02}$, are shown together in FIG. 15. Whereas the powder prepared from the amorphous boron material of the invention M$_1$ consists predominantly of MgB$_2$ as well as an MgO impurity, the powder prepared from the commercial amorphous boron material not according to the invention M'$_{02}$ contains MgB$_2$, MgO and Mg. An additional peak (indicated with a star in FIG. 15) could not be identified, and corresponds to an unknown contaminant. The relative intensities between the peaks of MgB$_2$ and those of MgO show that MgO is present in higher proportions in the powder obtained from M'$_{02}$ than in that obtained from M$_1$. A higher proportion of MgO as well as the presence of residual magnesium metal Mg in the powder obtained from M'$_{02}$ indicates that conversion of the amorphous boron to MgB$_2$ is not total in the reaction starting from the commercial boron not according to the invention M'$_{02}$.

This result confirms the higher reactivity of the material M$_1$ according to the invention in formation of MgB$_2$, compared to a commercial material M'$_{02}$, not according to the invention. Furthermore, the MgB$_2$ powder is of higher purity when it is obtained from M$_1$.

The results obtained with M'$_{02}$ confirm those described in the publication [Varin et al., *J. Alloys and Comp.*, 2006, 407, 268-273]. In fact, Varin et al. showed that reaction of magnesium with a commercial amorphous boron (particles with size in the range from 100 to 200 nm) requires a temperature of at least 650° C. so as to be able to form the phase MgB$_2$ quantitatively, and thus avoid formation of a mixture of several phases. In the case of a material according to the invention such as M$_1$, a temperature of 500° C. is sufficient.

The invention claimed is:

1. Nanostructured material consisting essentially of boron, wherein said material is in amorphous form and that it comprises aggregates of boron nanoparticles, wherein each of said aggregates represents an assemblage of boron nanoparticles bound together covalently by boron-boron bonds, wherein said boron nanoparticles have a size less than or equal to 25 nm, and wherein said aggregates have a size distribution in a dispersion measured by dynamic light scattering between 40 nm and 200 nm.

2. Material according to claim 1, wherein said material consists of at least 85 mol % of boron, the remainder being inevitable impurities resulting from the method for producing said material and/or from its oxidation and/or from the equipment used in the production process.

3. Material according to claim 2, wherein the inevitable impurities resulting from the method for producing said material are one or more of the following elements: Li, Na, K, Rb, Cs, I, Cl, Br, F.

4. Material according to claim 2, wherein the inevitable impurities comprise at most 5 mol % of oxygen.

5. Material according to claim 1, wherein said material has a specific surface area $S_{BET}$ of at least 500 m$^2$/g, said specific surface area $S_{BET}$ being calculated by the BET method.

6. Material according to claim 1, wherein said material has a density in the range from 1.1 to 2.3 g/cm$^{-3}$, said density being measured with a helium pycnometer.

7. Method for preparing a nanostructured material consisting essentially of boron of claim 1, wherein said method comprises at least one step i) of heating, under an inert atmosphere, of a mixture comprising at least one boron hydride and at least one inorganic salt, step i) being carried out at a temperature $T_s$ sufficient to decompose said boron hydride and for said salt to be at least partially in the molten state, and in that it further comprises:

a step ii) of cooling the mixture obtained at the end of step i), and a step iii) of purification of the mixture obtained at the end of step i) or step ii).

8. Method according to claim 7, wherein the boron hydride is selected from boranes and alkali metal borohydrides.

9. Method according to claim 7, wherein the temperature $T_s$ of step i) is from 600 to 1000° C.

10. Method according to claim 7, wherein the inorganic salt is an alkali metal halide.

11. Method according to claim 7, wherein the mixture comprises from 0.1 to 20 wt % of the boron hydride and from 80 to 99.9 wt % of inorganic salts.

12. Method according to claim 7, wherein said method further comprises a step iv) of drying the material from step iii).

13. Material according to claim 1, where said material has an X-ray diffraction pattern showing the presence of a halo and the absence of diffraction peaks.

14. Material according to claim 1, where said material is a porous material having a porosity of at least 50%.

15. Material according to claim 1, wherein said material has a density in the range from 1.1 to 1.6 g·cm$^{-3}$, said density being measured with a helium pycnometer.

16. Material according to claim 1, wherein said boron nanoparticles have a size ranging from 1 to 20 nm.

17. Nanostructured material consisting essentially of boron, wherein said material is in amorphous form and it comprises aggregates of boron nanoparticles, wherein each of said aggregates represents an assemblage of boron nanoparticles bound together covalently by boron-boron bonds, wherein said boron nanoparticles have a size less than or equal to 25 nm, and wherein said material has a specific surface area $S_{BET}$ of at least 500 m$^2$/g, said specific surface area $S_{BET}$ being calculated by the BET method.

18. Nanostructured material consisting essentially of boron, wherein said material is in amorphous form and it comprises aggregates of boron nanoparticles, wherein each of said aggregates represents an assemblage of boron nanoparticles bound together covalently by boron-boron bonds, wherein said boron nanoparticles have a size less than or equal to 25 nm, and wherein said material consists of at least 85 mol % of boron, the remainder being inevitable impurities resulting from the method for producing said material and/or from its oxidation and/or from the equipment used in the production process, the inevitable impurities resulting from the method for producing said material being one or more one or more halogen atoms and/or alkali metal atoms.

* * * * *